(12) United States Patent
Dietzsch et al.

(10) Patent No.: US 9,116,347 B2
(45) Date of Patent: Aug. 25, 2015

(54) ARRANGEMENT FOR ADJUSTING ILLUMINATION DEVICES IN TRANSMITTED-LIGHT MICROSCOPES

(75) Inventors: Leander Dietzsch, Jena (DE); Matthias Gonschor, Gleichen (DE); Angela Higgs, La Côte-Saint-André (FR); Alexander Scheps, Adelebsen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 594 days.

(21) Appl. No.: 13/554,845

(22) Filed: Jul. 20, 2012

(65) Prior Publication Data

US 2013/0021664 A1 Jan. 24, 2013

(30) Foreign Application Priority Data

Jul. 22, 2011 (DE) .......................... 10 2011 108 553

(51) Int. Cl.
*G02B 21/08* (2006.01)
(52) U.S. Cl.
CPC .................................... *G02B 21/086* (2013.01)
(58) Field of Classification Search
CPC ................ G02B 5/201; G02B 21/06–21/14; G02B 21/00; G02B 26/008; G02B 21/0032; G02B 21/362; G02B 5/0278; G02B 5/20; G02B 5/204; G02B 5/22; G02B 5/23; G02B 5/30; G02B 6/0001; G02B 7/006; G02F 1/133514; G02F 1/133509; G02F 1/133611; F21V 15/01; F21V 23/06; F21V 21/14; F21V 14/006; F21V 17/02; G03B 11/00

USPC ......... 359/232–234, 362, 368, 381, 384, 388, 359/490.02–490.03, 889–892; 250/498.1, 250/503.1; 362/640, 647, 649–651, 362/655–657, 255–256, 317, 319, 362, 368, 362/370–371, 433, 449, 457–458
See application file for complete search history.

(56) References Cited

U.S. PATENT DOCUMENTS

| | | | | |
|---|---|---|---|---|
| 4,363,532 | A | * | 12/1982 | Weber ........................... 359/381 |
| 4,407,569 | A | * | 10/1983 | Piller et al. ..................... 359/370 |
| 5,128,808 | A | | 7/1992 | Dosaka |
| 5,706,128 | A | * | 1/1998 | Greenberg ..................... 359/385 |
| 6,804,050 | B2 | * | 10/2004 | Parks ............................. 359/388 |
| 6,891,671 | B1 | * | 5/2005 | Greenberg ..................... 359/388 |
| 2009/0174938 | A1 | * | 7/2009 | Tsuchiya ....................... 359/388 |

FOREIGN PATENT DOCUMENTS

| | | |
|---|---|---|
| CN | 1132358 A | 10/1996 |
| CN | 2299327 | 12/1998 |

(Continued)

OTHER PUBLICATIONS

Chinese Search Report for Chinese Application No. 201210252353.1, dated Apr. 16, 2015, 3 pages.

*Primary Examiner* — Derek S Chapel
(74) *Attorney, Agent, or Firm* — Patterson Thuente Pedersen, P.A.

(57) ABSTRACT

An illuminating system for transmitted-light microscopes has a illuminator unit seated on a bracket. A condenser is mounted on the bracket by way of a condenser holder and is rotatable with respect to the bracket. The condenser has an integrated modulator slider that slidably extends through the condenser. The bracket has an upright portion with a window through which the modulator slider may be fed in the direction facing away from the operator. the bracket may be provided with a stand mount.

7 Claims, 4 Drawing Sheets

(56) References Cited

FOREIGN PATENT DOCUMENTS

| CN | 2507028 | 8/2002 |
| CN | 1428624 | 7/2003 |
| CN | 2619280 | 6/2004 |
| CN | 202003082 | 10/2011 |
| CN | 102508356 | 6/2012 |
| CN | 102636871 | 8/2012 |
| DE | 1 761 393 U | 2/1958 |
| DE | 40 36 065 C2 | 5/1991 |

* cited by examiner

ARRANGEMENT FOR ADJUSTING ILLUMINATION DEVICES IN TRANSMITTED-LIGHT MICROSCOPES

The invention relates to an arrangement for adjusting illumination devices in transmitted-light microscopes, comprising an illuminator unit and a condenser with an integrated modulator slider, with the illuminator unit and the condenser being arranged on a horizontal arm of a bracket, and the upright arm of the bracket being provided with a stand mount.

It is known that condensers are used in microscopes for optimizing the illuminating ray path. For transmitted-light applications they are usually arranged, together with a collector, between the illuminator unit and an object.

Such condensers may contain contrasting elements such as, e.g., phase annuli, slit diaphragms or prisms for interference contrast, which sometimes have to be oriented at an angle. It is known that such contrasting elements are arranged in a modulator slider or in a revolving modulator disk.

DE 40 36 065 C2 describes a condenser turret which is provided with two aligned revolving modulator disks and arranged in the illuminating ray path. The revolving disks have a common axis of rotation, and each can be revolved and arrested separately. They have openings to receive various optical elements that influence the ray path, in which way different methods of microscopy are implemented. Such a condenser turret has an intricate design. Moreover, the openings in the revolving disks are designed to receive a specific optical element only.

If modulator sliders are used, they are commonly arranged at right angles with the microscope's plane of symmetry and moved crossways relative to the position of an operator.

Such solutions may lead to space problems, especially with inverted microscopes, if micromanipulators are used, which are arranged on the right and left sides of the microscope as seen from the operator's viewpoint. To avoid these problems, one would have to shorten the modulation slider, which would, however, restrict the scope of possible contrasting methods.

Aware of these drawbacks, the invention is based on the problem to create an arrangement for the setting of illuminating systems of transmitted-light microscopes, with which restrictions of possible contrasting methods due to space restrictions are avoided.

SUMMARY OF THE INVENTION

An illuminating system for transmitted-light microscopes has a illuminator unit seated on a bracket. A condenser is mounted on the bracket by way of a condenser holder and is rotatable with respect to the bracket. The condenser has an integrated modulator slider that slidably extends through the condenser. The bracket has an upright portion with a window through which the modulator slider may be fed in the direction facing away from the operator. the bracket may be provided with a stand mount.

According to an embodiment of the invention, this problem is solved by means of an arrangement for the setting of illuminating systems of transmitted-light microscopes of the kind described above, thanks to the characteristics given in claim 1. Favorable embodiments are given in the dependent claims 2 through 5.

According to an embodiment of the invention, the condenser provided with the modulator slider is mounted to the horizontal arm of the bracket so as to be revolvable. Further, the upright arm of the bracket is provided with an opening for the purpose of feeding through it the modulator slider in the direction facing away from the operator Thus, due to this opening, even longer modulator sliders will not collide with the bracket.

It is a feature and advantage of embodiments of the invention that as the condenser is fastened in such a way as to be revolvable about the optical axis of the microscope, operators can bring the modulator slider into the optimum position to suit their requirements and the space conditions.

It is a feature and advantage of particular embodiments that the condenser is connected with a condenser holder that is mounted in the horizontal arm of the bracket so as to be revolvable, with the revolution of the said holder being fixable in defined angular positions.

In a particular embodiment, fixation of the angular position in the condenser holder is effected by means of click-stop elements, although other means of position fixation are feasible as well.

Due to this reproducible click-stop positioning, in particular embodiments of the invention, at particular angles, contrast methods can be applied in which an arrangement with a specified angular orientation is required, e.g., in case of prisms for interference contrast, slit diaphragms etc.

DETAILED DESCRIPTION

Figure 1:
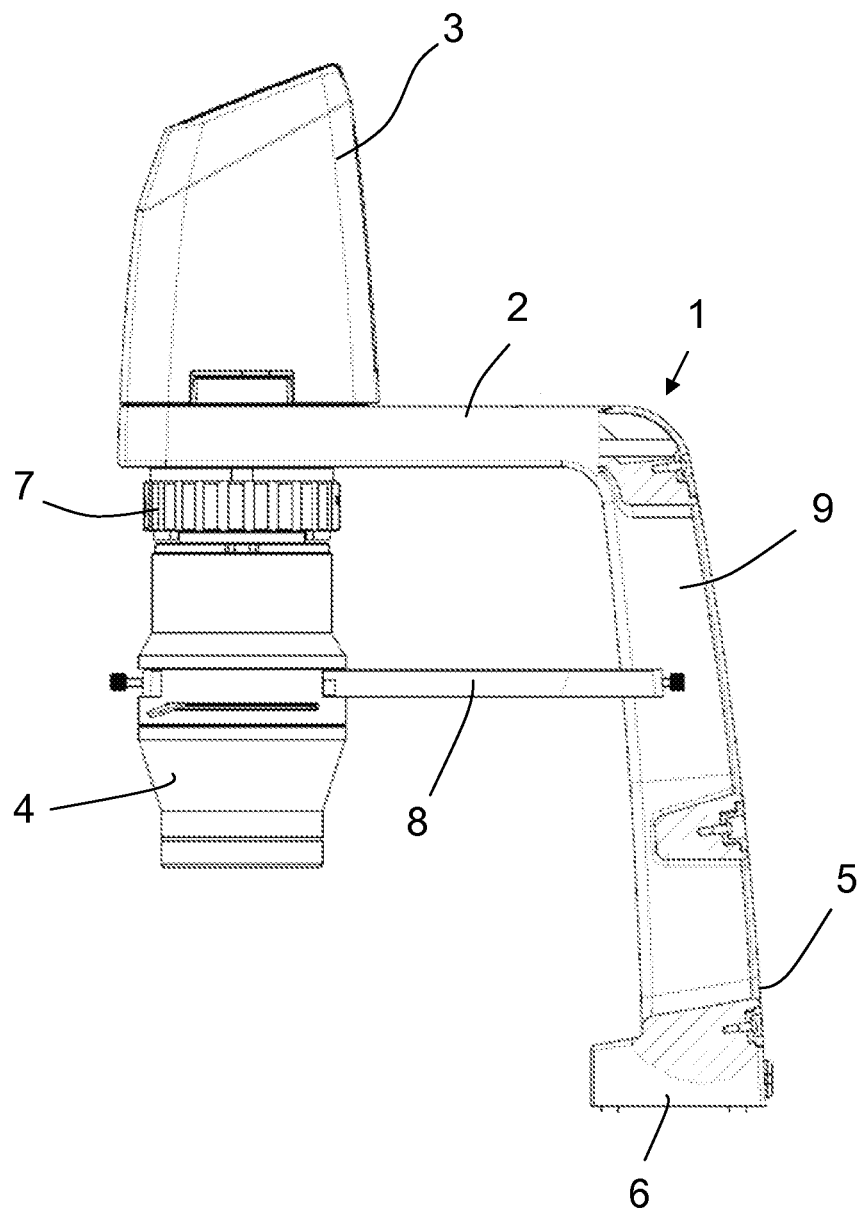
FIG. 1 is a side view of the arrangement.

FIG. 1 shows the invented arrangement with a support bracket 1, consisting of a horizontal arm portion 2 configured to hold an illuminator unit 3 and a condenser 4, and an upright arm 5 with a stand mount 6.

The illuminator unit 3 is directly mounted to the horizontal arm 2 of the bracket 1, whereas the condenser 4 is connected to the underside of the horizontal arm 2 of the bracket 1 via a revolvably mounted condenser holder 7.

In the condenser 4 there is a modulator slider 8, extending through a slot, which, if oriented towards the side facing away from an operator, may extend horizontally into an opening 9 in the upright arm 5 of the bracket 1.

Figure 2:
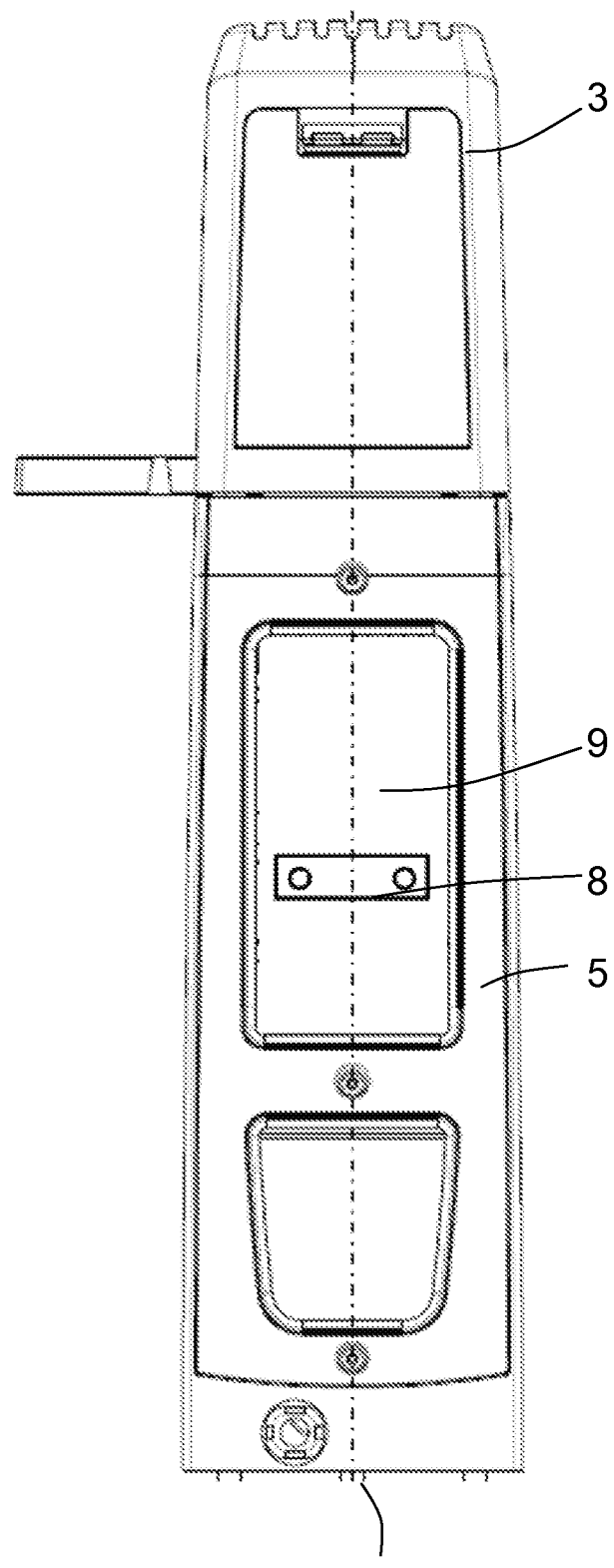
FIG. 2 shows the arrangement as an end view of the upright arm of the bracket as seen from an operator's viewpoint.

FIG. 2 shows the arrangement as a view of the upright arm 5 of the bracket 1 as seen from an operator's viewpoint, with the opening 9, the modulator slider 8, the stand mount 6 and the illuminator unit 3.

Figure 3:
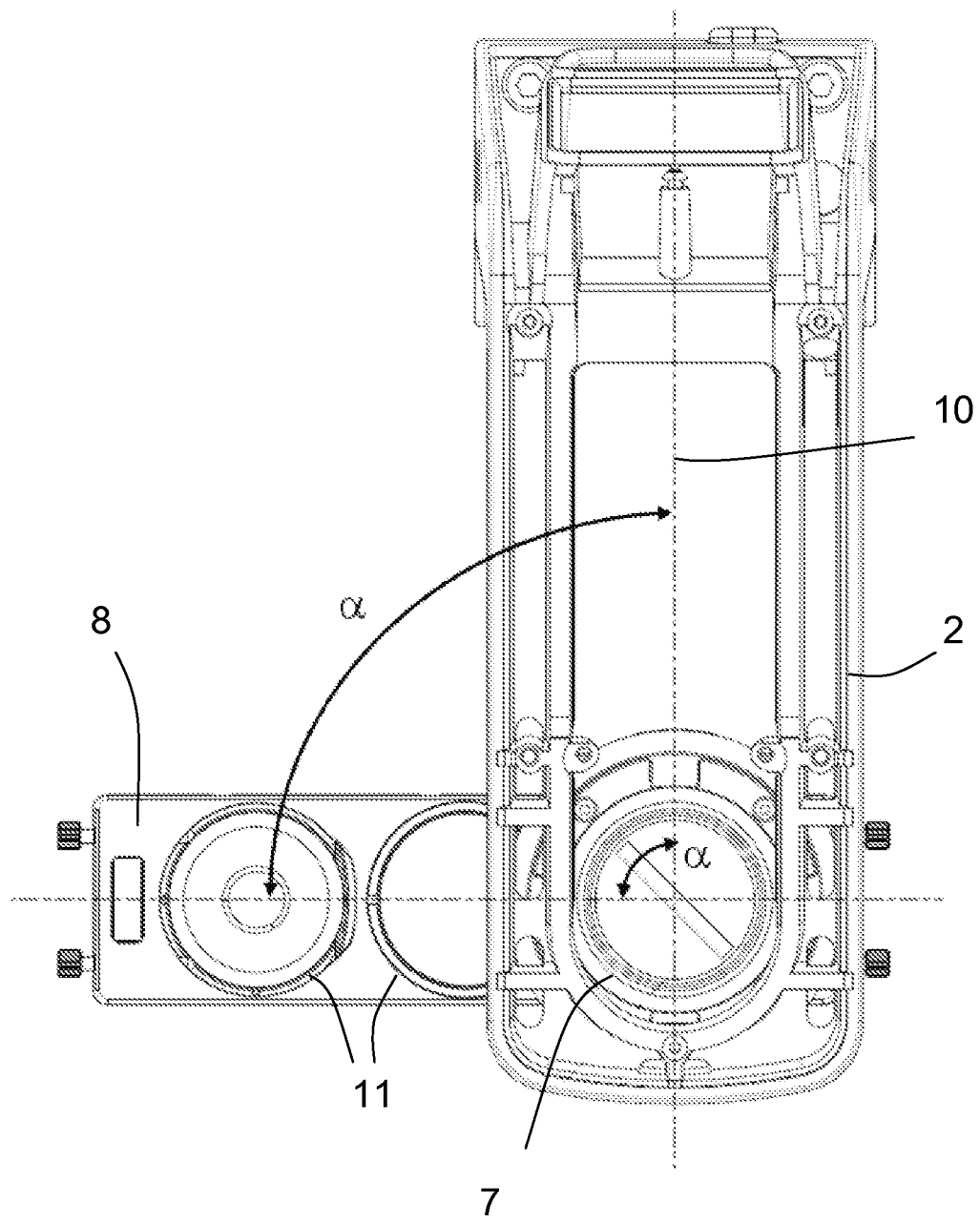
FIG. 3 shows the arrangement as a plan view of the horizontal arm of the bracket with panels and the illuminator unit removed.

FIG. 3 shows the arrangement as a view of the horizontal arm portion 2 of the support bracket 1, with the modulator slider 8 having an angular position α=90 degrees relative the plane of symmetry 10 of the horizontal arm 2. The modulator slider 8 with its seats 11 for optical elements has been moved out of the position shown in FIGS. 1 and 2 to the angular position α by a rotary movement of the condenser holder 7. Depending on its length, the modulator slider 8 may have to be pushed out of the opening 9 before its angular position α can be changed.

Figure 4:
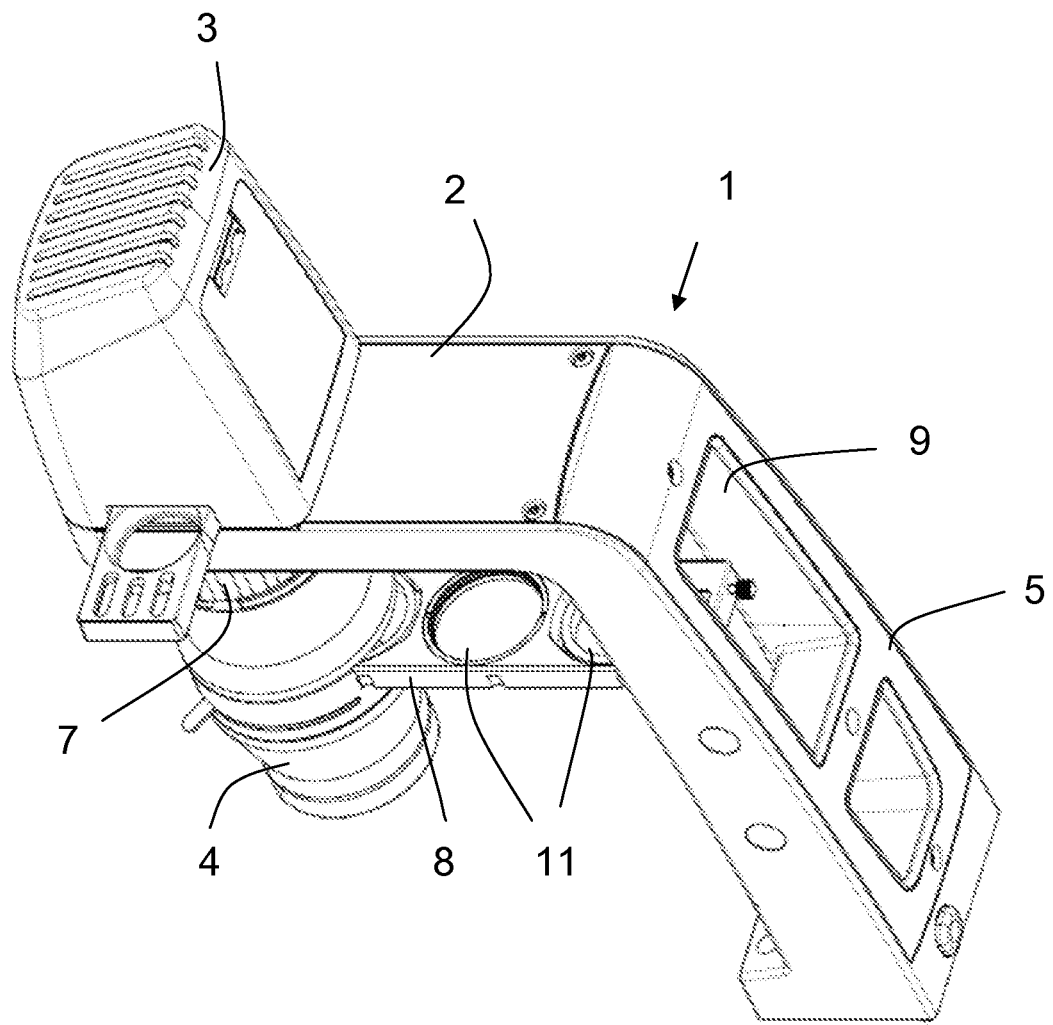
FIG. 4 is a perspective representation of the arrangement.

FIG. 4 is a perspective representation of the invented arrangement, with the position of the modulator slider 6 in accordance with FIGS. 1 and 2.

What is claimed is:

1. An illuminating system for transmitted-light microscopes comprising:
   a bracket having an upright support portion and a horizontal arm portion;
   an illuminator unit (3) mounted on the horizontal arm portion;
   a condenser revolvably mounted on the horizontal arm portion, the condenser having an integrated modulator slider slidably extending therethrough, whereby the slider is rotatable about a vertical axis, and
   wherein the upright support portion has an opening in which the integrated modulator slider is feedable therethrough.

2. An illuminating system for transmitted-light microscopes as claimed in claim 1, wherein the condenser (4) is mounted to the horizontal arm (2) of the bracket (1) so as to be revolvably connected thereto by way of a condenser holder (7).

3. An Illuminating system for transmitted-light microscopes as claimed in claim 2, wherein the revolving movement of the condenser holder (7) can be fixed in defined angular positions ($\alpha$).

4. An illuminating system for transmitted-light microscopes as claimed in claim 3, wherein for the purpose of fixing the angular position ($\alpha$), click-stop elements are provided in the condenser holder.

5. An illuminating system for transmitted-light microscopes as claimed in claim 1, wherein the revolving movement of the condenser holder (7) can be fixed in defined angular positions ($\alpha$).

6. An illuminating system for transmitted-light microscopes as claimed in claim 5, wherein for the purpose of fixing the angular position ($\alpha$), click-stop elements are provided in the condenser holder.

7. An arrangement for the setting of illuminating systems of transmitted-light microscopes as claimed in claim 1, characterized in that the modulator slider (8) is provided with various click notches of orientation to receive contrasting modules.

* * * * *

UNITED STATES PATENT AND TRADEMARK OFFICE
CERTIFICATE OF CORRECTION

PATENT NO. : 9,116,347 B2  
APPLICATION NO. : 13/554845  
DATED : August 25, 2015  
INVENTOR(S) : Leander Dietzsch et al.

Page 1 of 1

It is certified that error appears in the above-identified patent and that said Letters Patent is hereby corrected as shown below:

On Title Page, item (57) in the Abstract:
In line 2, delete the first occurrence of "a" and insert --an--

On Title Page, item (57) in the Abstract:
In line 8, delete "the" and insert --The--

Signed and Sealed this
Fifteenth Day of March, 2016

Michelle K. Lee
*Director of the United States Patent and Trademark Office*